(12) United States Patent
Walker et al.

(10) Patent No.: US 8,683,603 B2
(45) Date of Patent: Mar. 25, 2014

(54) CENTRALIZED ADMINISTRATION-BASED LICENSING SYSTEM

(75) Inventors: William T. Walker, Evergreen, CO (US); Benny J. Ellis, Westminster, CO (US)

(73) Assignee: Avaya Inc., Basking Ridge, NJ (US)

( * ) Notice: Subject to any disclaimer, the term of this patent is extended or adjusted under 35 U.S.C. 154(b) by 3 days.

(21) Appl. No.: 13/369,134

(22) Filed: Feb. 8, 2012

(65) Prior Publication Data

US 2013/0104240 A1    Apr. 25, 2013

Related U.S. Application Data

(60) Provisional application No. 61/549,421, filed on Oct. 20, 2011.

(51) Int. Cl.
*G06F 21/00* (2013.01)

(52) U.S. Cl.
USPC ........ 726/26; 726/3; 726/4; 726/29; 709/203; 709/223; 709/225; 709/226; 705/51; 705/310

(58) Field of Classification Search
USPC .......................................................... 726/26
See application file for complete search history.

(56) References Cited

U.S. PATENT DOCUMENTS

| 5,758,069 | A | 5/1998 | Olsen | |
|---|---|---|---|---|
| 7,854,011 | B2 | 12/2010 | Chen et al. | |
| 7,865,444 | B1 * | 1/2011 | Biswas et al. | 705/59 |
| 2002/0136405 | A1 | 9/2002 | Hori | |
| 2004/0172367 | A1 * | 9/2004 | Chavez | 705/59 |
| 2007/0164554 | A1 * | 7/2007 | Krone et al. | 283/56 |
| 2011/0047540 | A1 * | 2/2011 | Williams et al. | 717/178 |
| 2011/0072522 | A1 | 3/2011 | Koka et al. | |

OTHER PUBLICATIONS

Fickas et al; "Requirements Monitoring in Dynamic Environments"; O-tl86-7017-7/95 © 1995 IEEE.*
Carollo et al., U.S. Appl. No. 12/983,043, Entitled "Patch and Dot Release Licensing", filed Dec. 31, 2010, 19 pages.
Schmidt et al., U.S. Appl. No. 13/151,042, Entitled "Method and Apparatus for Assigning and Releasing Licenses", filed Jun. 1, 2011, 36 pages.
Citrix, "Licensing Basics", available at http://www.citrix.com/lang/english/lp/lp_2305120.asp, Citrix Systems, Inc., 4 pages.
IBM, "License Use Management", available at http://www-01.ibm.com/software/awdtools/lum/about.html, IBM, 8 pages.

* cited by examiner

*Primary Examiner* — Taghi Arani
*Assistant Examiner* — Jason Lee
(74) *Attorney, Agent, or Firm* — Sheridan Ross P.C.

(57) ABSTRACT

Methods and systems for providing a centralized management system with an integrated license server and pluggable license features are provided. More particularly, the administration of application instances or other assets through the centralized management system results in the initiation of a license validation process by the central management system in cooperation with a license server. The system management application providing centralized asset management and the license server performing license validation are co-resident on a central management server. The availability of assets requiring a license is implemented through asset administration data maintained by the central management server, to indicate the existence of a required license, where the license server indicates that the required license is available. Access to an asset is denied where the license server indicates the absence of a required license to the system management server.

16 Claims, 4 Drawing Sheets

CENTRALIZED ADMINISTRATION-BASED LICENSING SYSTEM

FIELD

This invention relates to the licensing of software in a system.

BACKGROUND

Enterprise communications systems may comprise multiple instances of server application software, such as a feature server. Such applications may implement a software licensing solution to ensure that the customer's software usage is within the bounds of the purchased license entitlements. A typical licensing solution is to have the application software interface with a license server (e.g., WebLM) to acquire license permissions for the software usage of the given application instance.

One approach to implementing licensing when there are multiple application instances (e.g., servers) is to have a dedicated license server co-resident with the application software (i.e., the license server and application can be on the same physical device). A license file with the licenses assigned to the given application instance is installed on the license server for use by the application. A co-resident license server has the advantage of making the licensing solution immune to network outages. However, the disadvantage of using dedicated license servers is that it requires multiple license server instances and license files when there are multiple application instances. This complicates license management because there are multiple license servers and license files to install and manage. This also makes license sharing between application instances more difficult, because moving licenses between application instances requires intervention on behalf of an administrator to decrement one license file and increment another. In addition, depending on the license server technology used, the use of multiple dedicated license servers can make it difficult for the customer to see a single, unified view of all the licenses across their enterprise.

Another approach is to use a centralized license server that is shared by the multiple application instances. Each application interface contacts the central license server to acquire the licenses it needs based on current usage. As licenses go out of use on a given application instance, they are returned to the license server and made available for use by another application instance. This has the advantage of providing a simple licensing solution for the customer (single license server and single license file) and allows dynamic license sharing between application instances with intervention by the administrator. It also readily provides the customer with a single consolidated view of all the licenses in their enterprise. Unfortunately, if the various licensed application instances (e.g., servers) are distributed in the customer's network as is typically the case, the communication between licensed applications and the license server is subject to network outages. As a result, a customer that is fully compliant with their purchased license entitlements can experience license errors, warnings and alarms due to a network outage that prevents the licensed application from contacting the license server. This issue is of particular concern for large global enterprises where the license server and licensed application instances may be on opposite sides of the globe.

The limitations of existing license systems are also apparent in connection with the licensing of individual features associated with licensed applications. In particular, licensing individual features or feature applications is complicated. Moreover, requiring independently deployed feature applications to obtain licenses by implementing a licensing server interface and the necessary enforcement actions, such as making license requests at the appropriate times, responding to license errors and implementing license grace periods, etc., in the application software increases the complexity of the new applications. This in turn increases the time required to bring those applications to market, and increases the cost of developing new applications.

SUMMARY

Embodiments of the present disclosure are directed to solving these and other problems and disadvantages of the prior art. In particular, a licensing solution is provided for multiple application instances that provides the benefits of a centralized license server, without the need for individual application instances to contact the license server and without the need for the license server to administer individual licenses for each application instance. More particularly, a system management server is provided with a co-resident system management server and license server. The system management server provides a central administration function with respect to multiple application instances and/or client devices. For example, applications, resources, and users can be managed from a single management console provided by the system management server. This centralized management solution provided by the system management server front ends an enterprise database that reflects the configured system and is used by all deployed applications and network resources. The license server determines whether a license necessary for utilization of a licensed asset is available, in response to a request from the system management server. In particular, an event or activity occurring with respect to the enterprise that requires a license, for example the registration of a new user or the addition of a new feature or application to a set of features or applications available to an existing user, is passed to the license server by the system management server. Accordingly, individual instances of applications or other licensed entities associated with the enterprise are not required to perform license validation. In addition, the system disclosed herein features a system management server that is co-resident with the license server. For example, the system management server and license server may be implemented as applications or processes running on the same management server. As a result, communications between the system management server and the license server are insulated from network outages.

The system can additionally include an application server. The application server can be used to administer features available to individual devices and/or application instances associated with the enterprise. The application server can also be co-resident with the system management server and the license server. Moreover, the application server can administer and control particular features available to particular devices and/or application instances. In addition, the application server can provide license enforcement through reduced functionality where particular functions are not licensed. Notably, the application server is not required to itself perform licensing operations. Instead, it simply administers the applications and/or features that are or are not available with respect to devices and/or application instances.

In accordance with embodiments of the present disclosure, a request for a license can be generated in connection with the occurrence of an event related to a licensed asset. More particularly, the event can include an administration change made on the central management server that impacts assets that require a license to access. As used herein, assets can include licensed software, such as an application instance, and/or separately licensed software features, modules or functions. Assets can be licensed for use by individual users and/or devices. In accordance with further embodiments, an asset can include a device. Accordingly, an administration change that is associated with a licensed asset requires license validation. More particularly, the system management server through which the administration change is made makes a license request to the license server to determine whether additional license usage is allowed. The system management server allows the requested administrative change if all necessary licenses are available, and blocks the change if needed licenses are not available from the license server. The allowance or disallowance of the requested change can be effected through a modification to a record maintained by the system management server with respect to the licensed asset. Where an application server is included in the system, the record associated with the licensed asset can be maintained by the application server at the direction of the system management server. In accordance with embodiments of the present disclosure, exchanges between the various servers are not subject to network outages, because the various servers are co-resident on the central management server.

In accordance with further embodiments, applications, including feature applications, are licensed to users of a system on a per user and per application basis. In connection with such features, a programmable licensing framework is provided that allows independently sold and deployed applications to use a common licensing utility provided as part of the application server platform software. Specifically, when a new licensed application is deployed on the application server platform, the installation package for that application will include identifying information such as the application name, the application release, and the feature keyword. This information can be included in the enterprise database maintained by the system management server. Moreover, the system management server can communicate with the license server to determine whether a license necessary for the application is available.

Additional features and advantages of embodiments of the present disclosure will become more readily apparent from the following description, particularly when taken together with the accompanying drawings.

DETAILED DESCRIPTION

Figure 1:
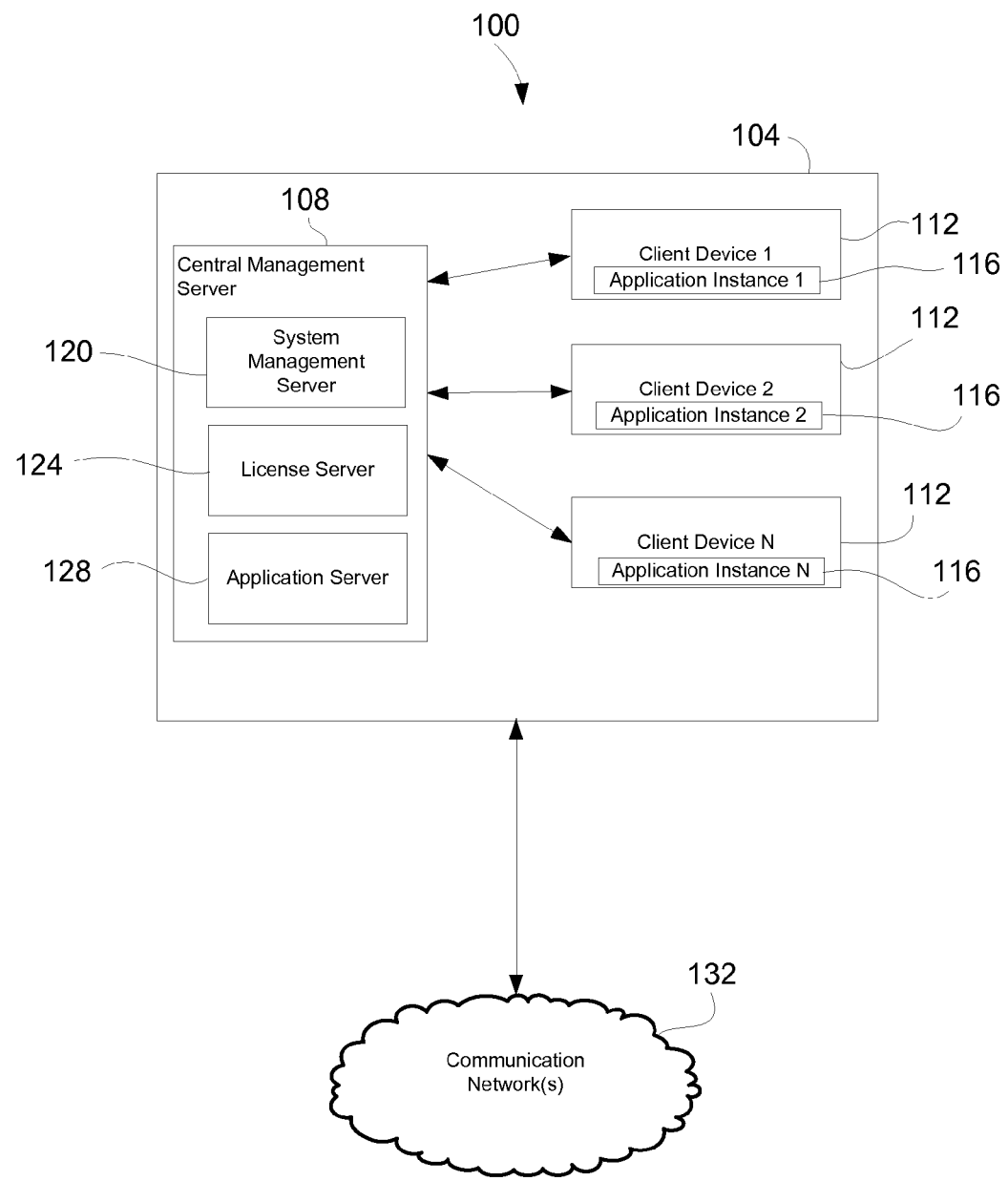
FIG. 1 depicts components of a system in accordance with embodiments of the present disclosure.

FIG. 1 illustrates an exemplary system 100 in accordance with embodiments of the present disclosure. In general, the system 100 includes an enterprise system 104. The enterprise system 104 includes a central management server 108, and one or more client devices 112. The enterprise system 104 also includes one or more application instances 116. Each application instance can be associated with a client device 112. For example, an application instance 116 can be resident on or executed in connection with a client device 112. Access to an application instance 116 requires that a license for the application instance be available. In accordance with at least some embodiments, separate features or functions of an application instance 116 can be licensed separately, in which case the scope of features or functions available to a user or in connection with an application instance 116 are determined by the scope of license rights available for use. The availability of a license for a licensed asset is determined by the central management server 108.

The central management server 108 generally includes a system management server 120 and a license server 124. In accordance with at least some embodiments of the present disclosure, the central management server 108 can additionally include an application server 128. In general, the system management server 120 operates to administer application instances 116 or other licensed assets. For example, the system management server 120, alone or in association with an application server 128, if provided, can administer records associated with application instances 116, to control access to the application instances 116 by individual users and/or client devices 112. In addition, changes to the existing records concerning application instances 116 are administered through the system management server 120. In particular, certain administrative changes with respect to application instances 116 can require that a suitable license be available. For example, the addition of a new user, client device 112, functions, or feature provided in association with an application instance 116, or a new application instance 116, can require an additional license. Accordingly, individual applications, whether full applications or application features, can be licensed on a per application instance 116 and per user (or per client device 104) basis. In response to an event associated with a requirement for a license, the system management server 120 initiates a license validation process.

The license validation process includes the system management server making a license request to the license server 124. The license server 124 responds to the request with an indication as to whether the required license is or is not available. Where the system management server 120 is informed by the license server 124 that a required license is available, the system management server 120 can revise the record associated with the licensed asset, to allow access to the licensed asset. In accordance with embodiments of the present disclosure, the system management server 120, the license server 124, and the feature server 128, if provided, are all co-resident on the central management server 128. More particularly, communications between any of the system management server 120, the license server 124 and the feature server 128 can be internal to the central management server 108, and are not required to be passed over a network. Connections between the central management server 108 and client devices 112 and/or application instances 116 can be over direct connections, a bus, or one or more networks within the enterprise system 104. In accordance with still other embodiments, the enterprise system 104 can be interconnected to one or more external communication networks 132, for example for communications with external devices and/or enterprises.

Figure 2:
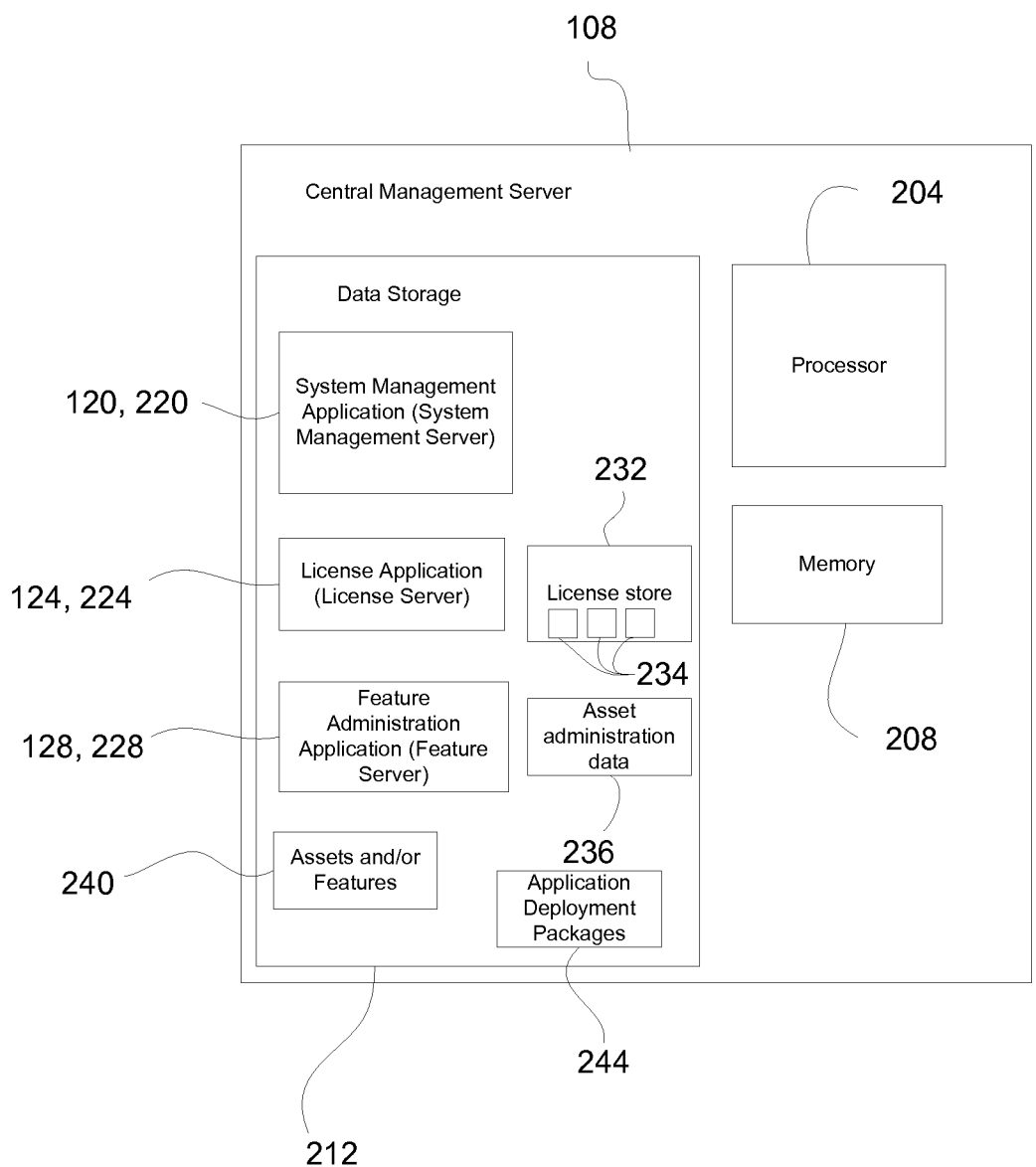
FIG. 2 depicts components of a central management server in accordance with embodiments of the present disclosure.

FIG. 2 illustrates additional aspects of a central management server 108 in accordance with embodiments of the present disclosure in greater detail. In general, the central management server 108 includes a processor 204. The processor 204 can comprise a general purpose programmable processor or controller for executing application programming or instructions. As a further example, the processor 204 may comprise a specially configured application specific integrated circuit (ASIC) or other integrated circuit, digital signal processor, hard wired electronic or logic circuit such as a discrete element circuit, programmable logic device or gate array, such as a PLD, PLA, FPGA, PAL, special purpose computer, or the like. The processor 204 generally functions to run programming code or instructions implementing the various functions of the central management server.

The central management server 108 may additionally include memory 208 for use in connection with the execution of application programming by the processor 204, and for the temporary or long term storage of program instructions and/or data. As examples, the memory 208 may comprise RAM, SDRAM, or other solid state memory. Alternatively or in addition, data storage 212 may be provided. In accordance with embodiments of the disclosed invention, data storage 212 can contain programming code or instructions implementing various of the applications, functions or modules executed or provided by the central management server 108. In addition, as described herein, memory 208 or data storage 212 is associated with the central management server 108 can include various records. More particularly, the various server instances provided by the central management server 108 can be implemented as applications executed by the central management server. Accordingly, application programming maintained in the data storage 212 can include a system management application 120, generally implementing the system management server 220, a license application 224, generally implementing the license server 124, and a feature administration application 228 generally implementing the feature server 128. Examples of data that can be stored in data storage 212 include a license store 232, containing licenses 234 currently available to the enterprise system 104, that is administered by the license server 124 through operation of the license application 224. An additional example is asset administration data 236, which can contain records related to the features and/or other attributes of administered elements of the enterprise system 104, such as client devices 112 and application instances 116. The asset administration data 236 can be maintained by the system management application 220, implementing the system management server 120, and/or the feature administration application 228, implementing the feature server 128. As a further example, various central management server assets or features 240 can be stored in data storage 212. Examples of central management server 108 assets or features 240 include application instances 116 or other services available to a client device 112 or application instance 116 from the central management server 108. The data storage 212 can also contain application deployment packages 244, which generally include code or instructions comprising an application or feature and licensing data, such as the application name, release, and feature keyword, that is used by the license server 124 to enforce the licensing. More particularly, the data in an application deployment package 244 allows new applications and/or features the deployed and licensed without requiring that the new application or feature itself implement licensing software.

Figure 3:
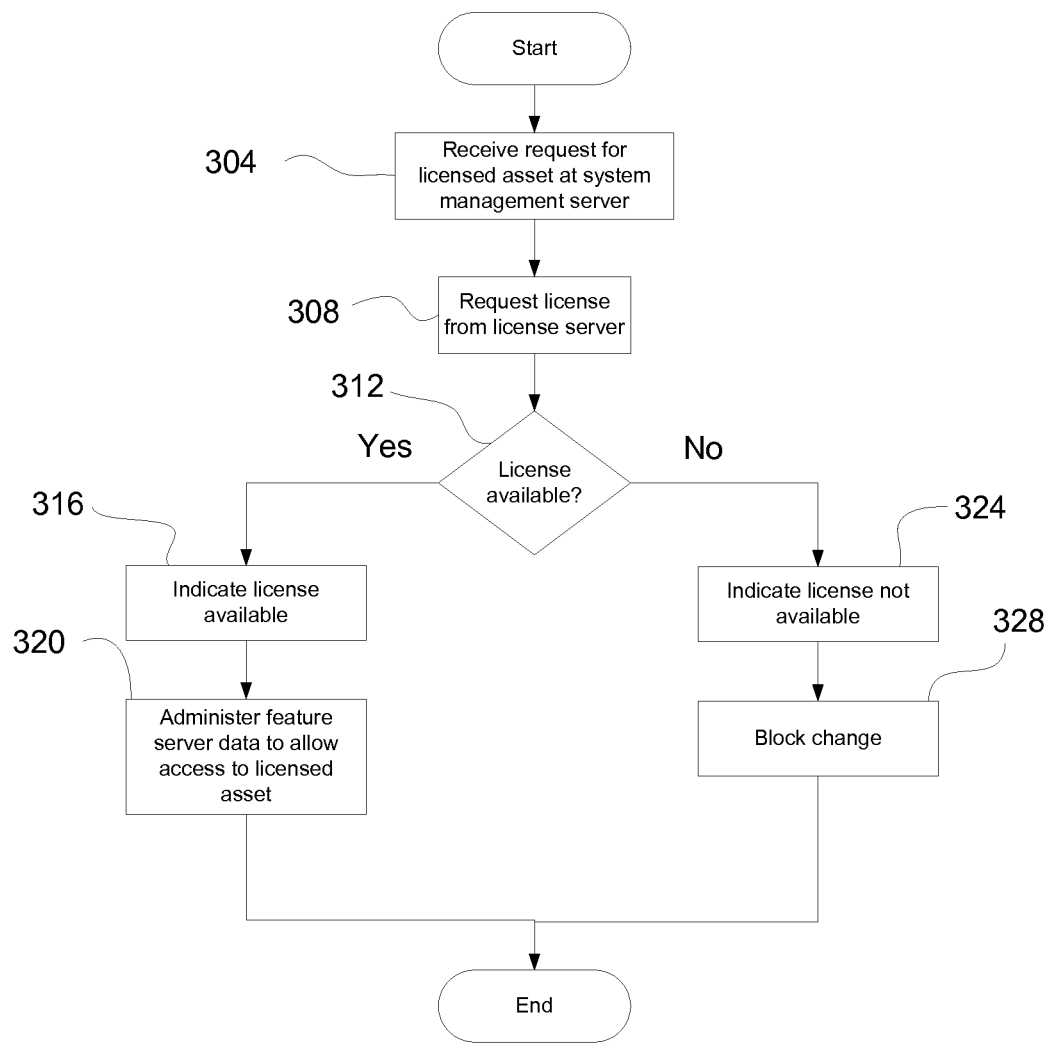
FIG. 3 is a flowchart illustrating aspects of the operation of a system in accordance with embodiments of the present disclosure.

FIG. 3 is a flowchart illustrating aspects of the operation of an enterprise system 104 providing a centralized management system for administering enterprise assets, including but not limited to application instances 116, and performing license validation functions in accordance with embodiments of the disclosed invention. Initially, at step 304, an event requiring that a license be obtained in connection with a licensed asset is received and/or detected at the system management server 120. For example, the association of a new user with an application instance 116, the activation of a previously unlicensed feature, the association of an additional application instance 116 with a current or pre-existing user or the addition of any functionality with respect to a user and/or an application instance 116 can comprise an event that requires a request for a license. Moreover, the change or addition with respect to the enterprise system 104 asset is generally made through the system management server 120. Therefore, the request for a license can be part of the handling of the administered change by the system management server 120. For instance, the addition of an application instance 116 comprising a new application feature with a new or existing user (or a new or existing client device 104) can result in the system management application creating a record or entry in the asset administration data 226 containing the application license name or feature keyword associated with the application instance 116, and the release associated with the application instance 116. In accordance with at least some embodiments, the application license name and/or application license release information included as part of the installation package for the application instance 116 is digitally signed, to prevent tampering with the licensing data.

At step 308, the system management server 120 requests the necessary license from the license server 124. The necessary license can comprise the license that covers the application license name of the subject application instance 116, and that has a release value that is equal to or greater than the application license release for the subject application instance 116. Accordingly, the request for a license required to enable the change is made when the change is administered, and is made by the system management server 120. As a result, individual licensed assets or associated entities, such as client devices 112 or application instances 116, are not required to directly participate in the license validation process. Instead, the license validation process is handled by the system management server 120 in association with the license server 124 when changes related to the licensed asset are administered or otherwise entered. Accordingly, the system management server 120 functions as an interface to the license server 124 on behalf of the application instance 116.

At step 312, the license server 124 determines whether the required license 234 is available. If the required license 234 is available, the license server 124 provides a signal to the system management server 120, indicating the availability of the required license. Accordingly, tracking the availability of licenses 234 to the enterprise system 104 can be performed by the license server 124. In response to receiving an indication that the required license 234 is available, the system management server 120 can administer the asset administration data 236 with respect to the licensed asset, to allow the requested access to the licensed asset. Where an application server 128 is provided, the system management server 120 can notify the application server 128 of the change, and that change can be made in the appropriate data 236 record by the application server 128 (step 316). Accordingly, the availability of the licensed asset can be recorded through an appropriate entry in the asset administration data 236. In accordance with at least some embodiments, license information can be provided in the form of a digitally signed package, to prevent revenue loss from tampering with the licensing data contained therein.

If the required license is not available, the license server 124 returns an indication to the system management application 120 that the required license is not available (step 324). The requested change related to the asset is then blocked (step 328). In accordance with embodiments of the present disclosure, a change is blocked through the absence of an entry in a record for the subject application instance 116 that would have permitted access to the application instance 116, or associated feature comprising the licensed asset in the associated asset administration data 236.

If an application instance 116 is not associated with licensing data, then no software licensing rules will be enforced for that application instance 116. Instead, users and/or client devices 104 associated with the application instance 116 can simply be entered as part of the asset administration data 226 maintained by the system management server 120, thereby enabling access to the application or features of an application comprising the application instance 116. In accordance with still other embodiments, if the license server 124 becomes unavailable, the system management server 120 can enter an error mode, provide a license grace period for some predetermined period of time, and perform associated logging and alarming functions. Other functions that can be performed by the system management server 120 include maintaining license state information for application instances 116, such as normal mode, error mode, or restricted mode states.

Figure 4:
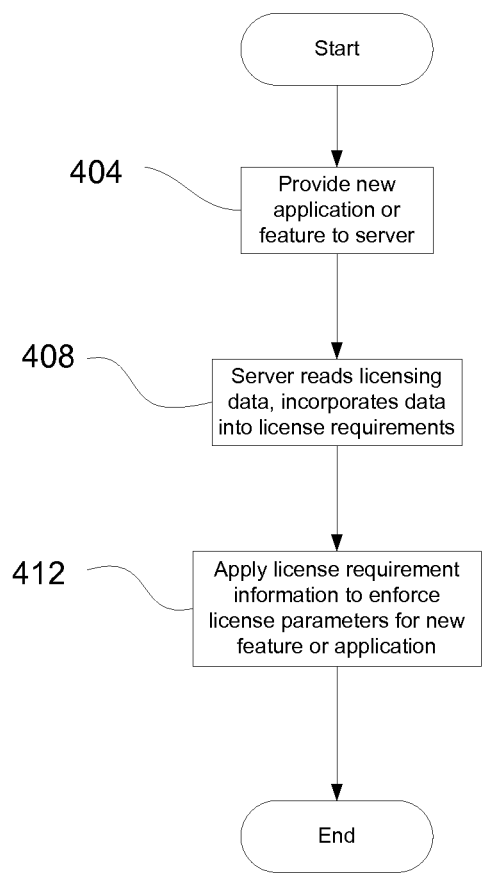
FIG. 4 is a flowchart illustrating additional aspects of the operation of a system in accordance with embodiments of the present disclosure.

With reference now to FIG. 4, additional aspects of the operation of a system 100 in accordance with embodiments of the present disclosure are illustrated. More particularly, aspects of the pluggable licensing features of the system 100 are illustrated. Initially, at step 404, a new application or feature, which may comprise an application instance 116, is provided to the central management server 108 as part of a deployment or application package 244. The deployment package 244 includes code or instructions comprising the application or feature and licensing data. More particularly, the licensing data can include the application name, release, and feature keyword. At step 408, the licensing data is read by the central management server 108, and that data is incorporated into license requirement information for the new application or feature. The license requirement information is then applied by the system management server 120 and the license server 124 to enforce the license parameters associated with the application or feature that has been added to the system 100 (step 412). That is, once the necessary license data or information has been obtained from the application deployment package 244, the license operations, for example as described in connection with FIG. 3 and other portions of the present disclosure, can be performed. As a result, embodiments of the present disclosure allow new applications and/or features to be deployed and licensed without having to implement any licensing software in the new application or feature itself. Moreover, license data provided as part of the application deployment package 244 is used by the existing system management application 220 and/or license application 224, without requiring modifications to those applications 220, 224. The system 100 can therefore readily accommodate new applications and features, and can enforce the licensing of such applications and features, without requiring changes to the programming code of the central management server 108 or the applications or features being deployed.

Accordingly, embodiments provide a pluggable licensing utility in which application instances 116 can be licensed on a per application instance 116 and user basis. Moreover, the system 100 can provide for licensing of application instances 116 comprising application features, without requiring integration of a licensing server interface with the individual application instance 116. Instead, a common licensing utility and interface are provided by the system management server 120. More particularly, the system management server 120 interfaces with the license server 124 in order to determine whether a license required to implement an application instance 116 is available, and to enable such access or deny such access depending on the license availability. Moreover, such functionality can be achieved while providing only simplified licensing information with individual application instances 116. Specifically, license information in the form of the application license name and application license release is sufficient, in combination with the license interface function provided by the system management server 120, to enforce licensing rules.

A central management server 108 as described herein can thus incorporate different servers 120, 124 and/or 128 and/or applications 220, 224 and/or 228 for performing various functions in connection with the allowance of disallowance of access to licensed assets within an enterprise system 104. In particular, different operations with respect to license validation can be performed by different components of the central management server 108. This compartmentalization can reduce the complexity of various components of the central management server 108, and the enterprise system 104, as compared to systems in which individual application instances or other licensed assets are required to perform license verification. In addition, by co-locating the servers 120, 124 and/or 128 and associated applications 220, 224 and/or 228 on a common server for example on a central management server 108, loss of communications between those components due to network outages is avoided. Moreover, network overhead and/or communication link bandwidth caused or consumed by license validation operations can be reduced as compared to systems in which license validation functions are distributed among separate servers or devices.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

What is claimed is:

1. A method, comprising:
receiving by a system management application a first event related to a first change with respect to an asset, wherein implementing the first change requires a license;
in response to receiving the first event, the system management application making a request to a license server application for the license required to implement the first change, wherein the license server application is co-resident with the system management application;
receiving by the system management application a notification from the license server application that the required license is available; and
in response to the notification from the license server application to the system management application that the required license is available, the system management application entering the first change in asset administration data, wherein the entry of the first change in asset administration data makes the asset available to a user through a client device, wherein the client device does not store or receive the license required to implement the first change, wherein the first change includes a request to register a new user, wherein the asset is an application instance, wherein the system management application implementing the first change includes the system management application receiving a response from the license server application that a license corresponding to an application license name and having a value equal to or greater than a license release value for the application instance is available and entering a corresponding change to an administration record to permit the first change with respect to the application instance, wherein the system management application enters a change to an administration record to permit the first change that includes the system management application administering information for the asset, and wherein the information is included as part of the system administration application.

2. The method of claim 1, further comprising:
receiving by the system management application a second event related to a second change with respect to an asset, wherein the second change requires a license;
in response to receiving the second event, the system management application making a request to the license server application for the license required to implement the second change;
receiving by the system management application a notification from the license server application that the required license is not available;
in response to the notification from the license server application to the system management application that the required license is not available, the system management application prohibiting the second change.

3. The method of claim 2, wherein the first event relates to a first application instance, and wherein the second event relates to a second application instance.

4. The method of claim 1, wherein receiving a first event includes receiving an application instance installation package that includes an application license name and an application license release value.

5. The method of claim 1, further comprising a system administration application, wherein the system administration application is co-resident with the system management application and the license server application.

6. The method of claim 1, wherein the system administration application, the system management application, and the license server application are co-resident on and executed by a central management server.

7. The method of claim 1, wherein all administration of license information included as part of the system administration application is performed by the system management application.

8. A system, comprising:
a plurality of client devices, wherein each client device is associated with an application instance;
a management server, including:
a processor;
memory;
a system management application, wherein the system management application is operable to administer records related to attributes of application instances associated with the client devices;
a license application, wherein the license application operates to provide licenses required in connection with application instances to the system management application, wherein the client devices do not store or receive the licenses, wherein in response to a license required in connection with a first application instance being provided by the license application, the system management application places an entry in a record for the first application instance to allow access by the first application instance to a licensed attribute on at least a first client device, wherein management of application instances associated with the client devices by the system management application includes allowing administrative changes that require an associated license, and wherein the associated license is returned in response to determining that a license corresponding to the necessary license has a release value that is equal to or greater than an application license release value as indicated by information associated with the application instance.

9. The system of claim 8, wherein the plurality of client devices and the management server are part of same enterprise.

10. The system of claim 9, wherein the plurality of client devices include communication devices.

11. The system of claim 8, wherein the license application is part of the system management application.

12. A non-transitory computer readable medium having stored thereon computer executable instructions, the computer executable instructions causing a processor included in a management server to execute a method for providing licensing services, the computer executable instructions comprising:
instructions to, in response to a request received at a system management application, query a license application for a license required to fulfill the received request, wherein the system management application and the license application are co-resident on the management server, wherein the license application operates to provide licenses required in connection with application instances to the system management application;
instructions to, in response to a return of the license required to fulfill the received request from the license application to the system management application, allow an activity associated with the received request by entering a change in asset administration data maintained by the system management application, wherein the received request includes a request to allow access to an application instance, wherein management of application instances associated with the client devices by the system management application includes allowing administrative changes that require an associated license, wherein the associated license is returned in response to determining that a license corresponding to the necessary license has a release value that is equal to or greater than an application license release value as indicated by information associated with the application instance, and wherein the license is delivered to or held by an endpoint that accesses the application instance.

13. The computer readable medium of claim 12, wherein the system management application implements the management server, and wherein the license application implements a license server.

14. The computer readable medium of claim 13, wherein allowing an activity associated with the request includes administering a record for a client device associated with the request, wherein a license having a license name and a release value specified by information associated with the application instance is available.

15. The computer readable medium of claim 14, wherein the record for the client device associated with the client device contains a set of features that the client device is allowed to access.

16. The computer readable medium of claim 15, the instructions further comprising instructions to deny a feature to a client device where a license required for the denied feature is not available from the license application.

* * * * *